United States Patent [19]

Chambers

[11] 4,065,145
[45] Dec. 27, 1977

[54] WHEELED VEHICLE FOR SEMI-AMBULATORY MEDICAL PATIENTS

[76] Inventor: Carter Carl Chambers, P.O. Box 576, Parker, Ariz. 85344

[21] Appl. No.: 671,755

[22] Filed: Mar. 30, 1976

[51] Int. Cl.² .............................................. B62K 3/16
[52] U.S. Cl. ............................ 280/87.02 R; 272/70.3; 280/62; 297/5
[58] Field of Search ............... 280/87.02 R, 87.02 W, 280/87.01, 87.03, 87.05, 62, 281, 282, 261; 272/70.3, 73, 70, 1 D, 33 B; 297/5, 6, DIG. 4

[56] References Cited

U.S. PATENT DOCUMENTS

| | | | |
|---|---|---|---|
| 1,470,441 | 10/1923 | Green | 280/87.05 |
| 2,497,121 | 2/1950 | Fletcher | 280/261 |
| 2,660,442 | 11/1953 | Wiesner et al. | 280/87.05 X |
| 2,774,605 | 12/1956 | Schladebach | 280/62 X |
| 2,926,927 | 3/1960 | Enright | 280/87.02 R |
| 3,664,684 | 5/1972 | Long | 280/282 |
| 3,781,031 | 12/1973 | Patin | 280/62 |

*Primary Examiner*—Joseph F. Peters, Jr.
*Assistant Examiner*—John A. Pekar
*Attorney, Agent, or Firm*—Cates & Roediger

[57] ABSTRACT

The vehicle has a support component which has two wheels and a framework supporting a seat above and forward of the two wheels, a second steering component which has a wheel and means for steering the wheel and means disposed just above ground level for connecting the components so that a provisionally ambulatory medical patient who is either weak from disease or injury or who is partially crippled can mount the self-supporting vehicle and ride it from point to point without changing from a standing position.

5 Claims, 4 Drawing Figures

WHEELED VEHICLE FOR SEMI-AMBULATORY MEDICAL PATIENTS

BACKGROUND OF THE INVENTION

This invention relates to personal vehicles for assisting medical and surgical patients to become ambulatory sooner than would otherwise be feasible.

At present there is a need in hospital nursing home and other medical and physical care facilities for a vehicle which will assist provisionally ambulatory patients in getting about from place to place within the facility.

In the past such vehicles have been confined to the traditional wheel chair, wheel stretchers and beds and non-wheeled walkers. As useful as they are they do not meet the needs of the person who needs to get about to a limited extent by himself and who needs both to support himself and to conserve his energy in doing so.

Examples of patients having such needs are patients who are recovering from an operation or the effects of disease and who are consequently weakened but otherwise mechanically intact, elderly patients in rest homes who have a need to move about while conserving energy, patients with leg injuries either to one or both legs, as for example single amputees and persons having a leg in a cast. Another aspect of the need exists for people who want to become active at an early date after surgery and enjoy the benefits of mild exercise.

The need is also felt by persons confined at home who are subject to weaknesses and disabilities.

BRIEF SUMMARY OF THE INVENTION

It occurred to me that if a stable vehicle could be provided which is not difficult to mount and which does not require getting up and down to utilize it the objectives implied by the statement of a need for such a vehicle could be obtained.

I have invented a vehicle for use by medical and surgical patients and homebound persons in need of assistance in getting about from place to place which has a patient support component comprising two spaced wheels, a seat and means for supporting and adjusting the seat above the wheels. It has a second steering component which comprises a wheel having steering means and a third component which comprises means disposed at or near ground level, that is to say as close to ground level as is compatible with the terrain or floor covering to be traversed, for connecting the support and steering components. Preferably the seat is supported within the triangle defined by the wheels to provide maximum stability.

In two preferred embodiments the means for connecting the support and steering components is a bar disposed just above ground level which extends longitudinally of the vehicle between the rear support component and the forward steering component. In a preferred embodiment the bar is offset to one side such that the patient can position himself at the center of the vehicle without encountering the bar.

A more complete understanding of the invention may be obtained by consideration of the attached drawings in which.

DETAILED DESCRIPTION OF THE PREFERRED EMBODIMENTS OF THE INVENTION

Figure 1:
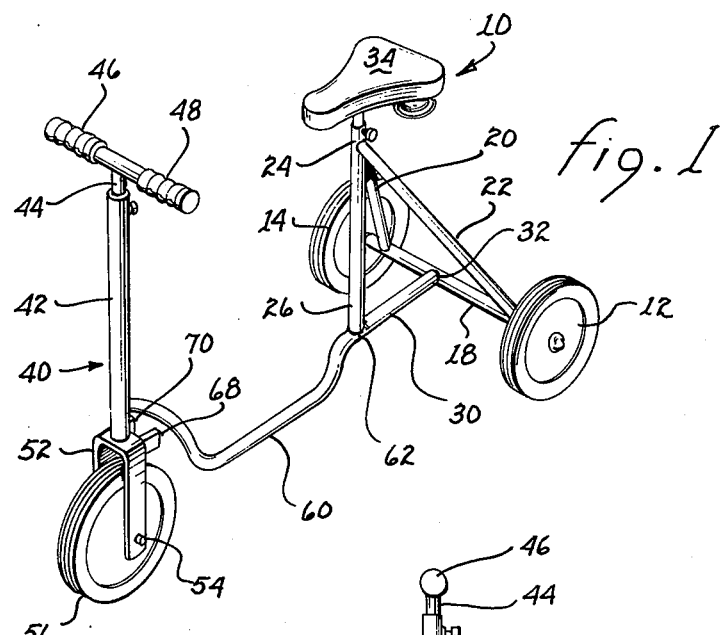
FIG. 1 is an isometric view of a preferred embodiment of the invention.
Figure 2:
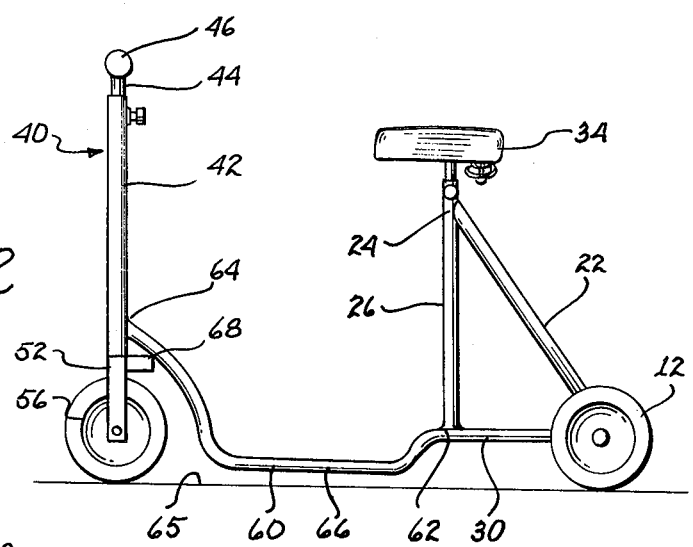
FIG. 2 is an elevation view of the invention of FIG. 1.
Figure 3:
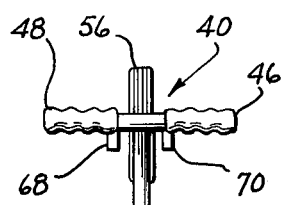
FIG. 3 is a top plan view of the vehicle of FIG. 1.
Figure 3:
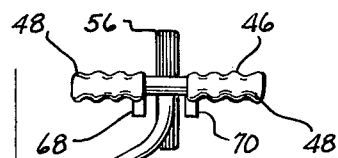
Figure 3:
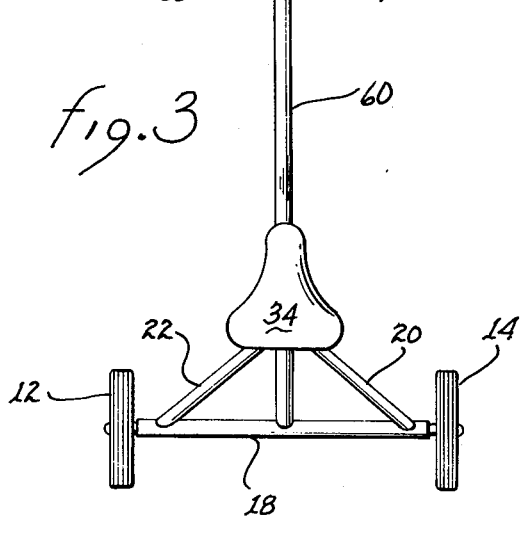

In a preferred embodiment shown in FIGS. 1 through 3 the support component 10 has two wheels 12, 14 mounted on an axle, not shown, disposed within a sleeve 18 which is part of the frame work for the support component. The sleeve 18 is welded to support pieces 20, 22 which in turn are welded to the upper end 24 of seat post sleeve 26. The lower end of seat post sleeve 26 is welded to cross member 30 (as at 62) which in turn is welded to sleeve 18 at juncture 32.

The seat 34 is adjustably disposed within the seat post sleeve 26. It may be adjusted upwardly or downwardly to suit convenience of the user in a conventional manner. It should be adjusted to a height which will permit the user to be seated upon it with a minimal flexion of the knee joint to avoid placing stress on the user.

The steering component 40 has a sleeve 42 in which is disposed a steering column 44 which has a handle bar 46 at a separate end with padded grips 48. The steering column 44 is journaled in the steering sleeve by means of a roller bearing assembly, not shown, which is conventional. The lower end of the steering column 44 terminates in a fork 52 which accommodates a front axle 54 which supports the front wheel 56 in a manner also conventional.

The two components 10 and 40 are joined together by a single bar 60 which connects the lower end 28 of the seat post sleeve to the steering sleeve 42. In this case the bar 60 is tubular, of steel construction and is welded at the two points 62, 64 where it joins the seat post sleeve and steering sleeve respectively.

The bar is in this case disposed within a few inches of the floor surface 65, descending from point 62 to section 66 whence it turns upward to clear the wheel 56. Thus the user may take the smallest possible step to clear the bar 60 and place himself in position to support himself on the seat 34. In FIG. 2 the bar 60 is below the axes of the wheels.

Figure 4:
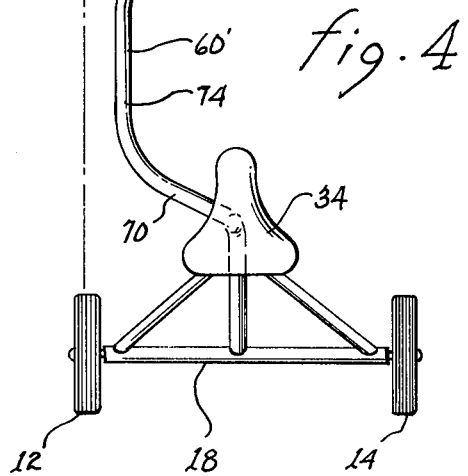
FIG. 4 is a top plan view of a preferred alternative embodiment of the vehicle depicted in FIGS. 1, 2 and 3.

In an alternative preferred embodiment as shown in FIG. 4 the bar 60 has a different configuration. For the purpose of describing FIG. 4 the bar 60 will be referred to as bar 60'. In FIG. 4 the bar 60' is attached to the lower end 28 of the seat post sleeve 26 at one side where it is secured by welding or other suitable means. From that point it extends to one side by means of a leg 70 to a point just inside the rear wheel 12. There it makes a turn forward and extends toward the steering component by means of leg 74 and again turns toward the center and continues along the leg 76 to the steering sleeve 42 where it is joined by welding or other suitable means. The seat 34 is positioned over the rear portion of said offset support bar 60.

In this embodiment the patient need not step over the connecting bar 60. This is especially useful for patients who are unable to attain more than a shuffling gait.

The seat 34 may be any one of a number of configurations. The familiar bicycle seat configuration is useful and comfortable to the user, providing a feeling of support. It should be comfortably padded.

It can also be seen that an alternative seat configuration such as straight front, or indented instead of protruding front may be used, the important consideration being that once the patient has taken his position that he be able to lean back and be supported comfortably and securely by the seat with a minimum flexion of the knees.

The three wheeled vehicle gives support at three places which is a very stable arrangement and a major consideration for those who are disabled and whose balance is precarious. To prevent abrupt turning of the steering column which might result in upset, rearwardly extending spurs 68 and 70 are provided to engage the bar 60 near the steering post sleeve 42.

It is to be understood that additional wheels could be added and that this would be within the spirit of the invention.

It is also to be understood that the handle bars may be other than straight as for example curved, and that the wheels may be attached by various means which are known to the art.

Having thus described the preferred embodiments of the invention it is my intention to claim all obvious modifications and equivalents thereof, the scope of this invention to be bound and defined by the attached claims.

I claim:

1. A patient vehicle comprising a support component comprising two spaced wheels, a seat, and means for supporting said seat on said wheels; a steering component comprising a wheel having steering means; means connecting said components and defining a center line dividing said vehicle into right and left parts, said means having a portion offset to one side of the center line of the vehicle to allow clearance for the feet of the user; said seat being positioned over the rear portion of said offset portion such that a patient may mount the seat without stepping over said offset portion.

2. The vehicle of claim 1 having means disposed on said steering component to prevent the turning of the wheel past a predetermined angle, to preserve the stability of the vehicle.

3. The vehicle of claim 2 wherein said means disposed on the steering component to prevent the turning of the wheel past a pre-determined angle comprises a pair of rearwardly extending spurs disposed to engage said means connecting said components.

4. The vehicle of claim 1 wherein said seat is adjustable.

5. The vehicle of claim 1 wherein said offset portion is disposed just above ground level.

* * * * *